United States Patent
Zhang et al.

(10) Patent No.: US 12,067,759 B2
(45) Date of Patent: Aug. 20, 2024

(54) METHOD OF CONSTRUCTING TRANSFORMER MODEL FOR ANSWERING QUESTIONS ABOUT VIDEO STORY AND COMPUTING APPARATUS FOR PERFORMING THE SAME

(71) Applicant: SEOUL NATIONAL UNIVERSITY R&DB FOUNDATION, Seoul (KR)

(72) Inventors: Byoung-Tak Zhang, Seoul (KR); Seongho Choi, Seoul (KR)

(73) Assignee: SEOUL NATIONAL UNIVERSITY R&DB FOUNDATION, Seoul (KR)

(*) Notice: Subject to any disclaimer, the term of this patent is extended or adjusted under 35 U.S.C. 154(b) by 0 days.

(21) Appl. No.: 17/615,662

(22) PCT Filed: Sep. 28, 2021

(86) PCT No.: PCT/KR2021/013257
§ 371 (c)(1),
(2) Date: Dec. 1, 2021

(87) PCT Pub. No.: WO2023/286914
PCT Pub. Date: Jan. 19, 2023

(65) Prior Publication Data
US 2024/0037896 A1  Feb. 1, 2024

(30) Foreign Application Priority Data
Jul. 16, 2021 (KR) .......................... 10-2021-0093486

(51) Int. Cl.
*G06V 10/44* (2022.01)
*G06V 10/25* (2022.01)
(Continued)

(52) U.S. Cl.
CPC .............. *G06V 10/44* (2022.01); *G06V 10/25* (2022.01); *G06V 10/764* (2022.01); *G06V 40/20* (2022.01); *H04N 21/4884* (2013.01)

(58) Field of Classification Search
CPC ...... G06V 10/44; G06V 10/25; G06V 10/764; G06V 40/20; H04N 21/4884
See application file for complete search history.

(56) References Cited

U.S. PATENT DOCUMENTS

| | | |
|---|---|---|
| 2016/0342895 A1 | 11/2016 | Gao et al. |
| 2018/0210874 A1 | 7/2018 | Fuxman et al. |

(Continued)

FOREIGN PATENT DOCUMENTS

| | | | | |
|---|---|---|---|---|
| CN | 113221681 A | * | 8/2021 | ......... G06K 9/00335 |
| CN | 112784730 B | * | 3/2022 | ......... G06K 9/00268 |

(Continued)

OTHER PUBLICATIONS

Linjie Li et al., "HERO: Hierarchical Encoder for Video+Language Omni-representation Pre-training", arXiv:2005.00200v2, 2020, pp. 1-21 (21 pages total), Retrieved from: https://arxiv.org/pdf/2005.00200v2.pdf.

(Continued)

*Primary Examiner* — Pinalben Patel
(74) *Attorney, Agent, or Firm* — Sughrue Mion, PLLC

(57) ABSTRACT

A method of constructing a transformer model for answering questions about a video story according to an embodiment includes: extracting feature vectors related to each character of a video from video data including vision data and subtitle data and question data for video questions and answers, and generating an input embedding using the feature vectors related to the character; and training a transformer model using the input embedding.

11 Claims, 5 Drawing Sheets

(51) Int. Cl.
*G06V 10/764* (2022.01)
*G06V 40/20* (2022.01)
*H04N 21/488* (2011.01)

(56) References Cited

U.S. PATENT DOCUMENTS

| | | | |
|---|---|---|---|
| 2019/0108446 A1* | 4/2019 | Lyu | G06F 16/53 |
| 2020/0279556 A1 | 9/2020 | Gruber et al. | |
| 2020/0304755 A1* | 9/2020 | Narayan | G06V 40/168 |
| 2021/0248375 A1* | 8/2021 | Geng | G06F 16/9035 |

FOREIGN PATENT DOCUMENTS

| | | | |
|---|---|---|---|
| CN | 115496863 A | * | 12/2022 |
| CN | 116543445 A | * | 8/2023 |
| CN | 116563751 A | * | 8/2023 |
| KR | 10-2020-0070142 A | | 6/2020 |
| KR | 10-2020-0144417 A | | 12/2020 |
| WO | 2016/163565 A1 | | 10/2016 |

OTHER PUBLICATIONS

Ashish Vaswani et al, "Attention Is All You Need", arXiv:1706.03762v1, 2017, pp. 1-15 (15 pages total), Retrieved from: https://arxiv.org/pdf/1706.03762v1.pdf.

Björn Bebensee et al., "Co-attentional Transformers for Story-Based Video Understanding", arXiv:2010.14104v1, Oct. 27, 2020, 5 pages total [Retrieved from: https://arxiv.org/pdf/2010.14104.pdf].

* cited by examiner

METHOD OF CONSTRUCTING TRANSFORMER MODEL FOR ANSWERING QUESTIONS ABOUT VIDEO STORY AND COMPUTING APPARATUS FOR PERFORMING THE SAME

CROSS REFERENCE TO RELATED APPLICATIONS

This application is a National Stage of International Application No. PCT/KR2021/013257 filed Sep. 28, 2021, claiming priority based on Korean Patent Application No. 10-2021-0093486 filed Jul. 16, 2021.

TECHNICAL FIELD

The embodiments disclosed herein relate to a method of constructing a transformer model for answering questions about a video story and a computing apparatus for performing the method.

The present application claims priority based on Jul. 16, 2021, and all contents disclosed in the specification and drawings of a corresponding application are incorporated herein by reference.

The present study was conducted as a result of the research into the Innovation Growth Engine Project of the Korean Ministry of Science and ICT and the Institute of Information & Communications Technology Planning & Evaluation (IITP-2017-0-01772-005).

The present study was conducted as a result of the research into the Software Computing Industry Fundamental Technology Development Project of the Korean Ministry of Science and ICT and the Institute of Information & Communications Technology Planning & Evaluation (IITP-2015-0-00310-007).

BACKGROUND ART

Recently, the field of video story modeling is emerging as a high-level field in which visual processing research and natural language processing research converge together. As a representative technology for dealing with the convergence of visual processing and natural language processing, there is Visual Question Answering (VQA) technology. VQA technology analyzes data contained in a video to answer questions about the meanings or plot of the video, and infers answers to questions accordingly.

However, the issue of answering questions about a video story is evaluated as a field that is difficult to resolve due to the nature of a video itself in which the video contains a tremendous amount of information unlike a simple image and due to an increase in the difficulty of the issue which is attributable to the various types of questions resulting from the nature of the video. In particular, there is a limitation in that it is difficult to acquire desired information in the case of a long video in which stories are connected.

Meanwhile, the above-described background technology corresponds to technical information that has been possessed by the present inventor in order to contrive the present invention or that has been acquired in the process of contriving the present invention, and can not necessarily be regarded as well-known technology that had been known to the public prior to the filing of the present invention.

DISCLOSURE

Technical Problem

The embodiments disclosed herein are intended to construct a transformer model capable of effectively answering questions about a video story.

Technical Solution

As a technical solution for solving the above-described technical problem, according to an embodiment, there is provided a method of constructing a transformer model for answering questions about a video story, the method including: extracting feature vectors related to each character of a video from video data including vision data and subtitle data and question data for video questions and answers, and generating an input embedding using the feature vectors related to the character; and training a transformer model using the input embedding.

In this case, generating the input embedding may include: classifying the vision data, the subtitle data, and the question data into a plurality of categories; extracting feature vectors for the plurality of respective categories; generating a feature embedding, a segment embedding, and a position embedding using the extracted feature vectors; and generating the input embedding by summing the feature embedding, the segment embedding, and the position embedding; and the plurality of categories may include one or more categories related to features of the character.

In this case, the categories related to the features of the character may include a bounding box including the character in an image frame included in the video, the behavior of the character, and the emotion of the character.

Furthermore, in this case, generating the feature embedding, the segment embedding, and the position embedding using the extracted feature vectors may include: generating the feature embedding by concatenating all the feature vectors extracted for the plurality of respective categories; generating the segment embedding by performing embedding lookups using a learnable embedding matrix for the plurality of respective categories; and generating the position embedding by generating vectors including position information related to the feature vectors extracted for the plurality of respective categories.

Meanwhile, training the transformer model may be performed via multi-task learning including masked language modeling, masked frame modeling, and response language modeling.

According to another embodiment, there is provided a computer program for performing a method of constructing a transformer model for answering questions about a video story, the method of constructing a transformer model for answering questions about a video story including: extracting feature vectors related to each character of a video from video data including vision data and subtitle data and question data for video questions and answers, and generating an input embedding using the feature vectors related to the character; and training a transformer model using the input embedding.

According to still another embodiment, there is provided a computer-readable storage medium having stored therein a program for performing a method of constructing a transformer model for answering questions about a video story, the method of constructing a transformer model for answering questions about a video story including: extracting feature vectors related to each character of a video from video data including vision data and subtitle data and question data for video questions and answers, and generating an input embedding using the feature vectors related to the character; and training a transformer model using the input embedding.

According to still another embodiment, there is provided a computing apparatus for constructing a transformer model for answering questions about a video story, the computing apparatus including: an input/output unit configured to receive video data including vision data and subtitle data and question data for video questions and answers, and to output video story question and answer results; a storage unit configured to store a program and data for answering questions about a video story; and a control unit including at least one processor, and configured to construct a transformer model for answering the questions about the video story by executing the stored program; wherein the control unit extracts feature vectors related to each character of a video from the video data and the question data, generates an input embedding using the feature vectors related to the character, and trains the transformer model using the input embedding.

In this case, when generating the input embedding, the control unit may generate the input embedding by classifying the vision data, the subtitle data, and the question data into a plurality of categories, extracting feature vectors for the plurality of respective categories, generating a feature embedding, a segment embedding, and a position embedding using the extracted feature vectors, and summing the feature embedding, the segment embedding, and the position embedding, in which case the plurality of categories may include one or more categories related to features of the character.

Furthermore, in this case, the categories related to the features of the character may include a bounding box including the character in an image frame included in the video, the behavior of the character, and the emotion of the character.

Furthermore, in this case, when generating the feature embedding, the segment embedding, and the position embedding using the extracted feature vectors, the control unit may generate the feature embedding by concatenating all the feature vectors extracted for the plurality of respective categories, may generate the segment embedding by performing embedding lookups using a learnable embedding matrix for the plurality of respective categories, and may generate the position embedding by generating vectors including position information related to the feature vectors extracted for the plurality of respective categories.

Meanwhile, when training the transformer model, the control unit may perform multi-task learning including masked language modeling, masked frame modeling, and response language modeling.

Advantageous Effects

According to any one of the above-described technical solutions, there is achieved the effect of effectively acquiring desired information even when the length of a video story is long by performing modeling based on a character appearing in the video story.

The effects that can be obtained by the embodiments disclosed herein are not limited to the above-described effects, and other effects that have not been described above will be apparently understood by those having ordinary skill in the art, to which the present invention pertains, from the following description.

MODE FOR INVENTION

Figure 1:
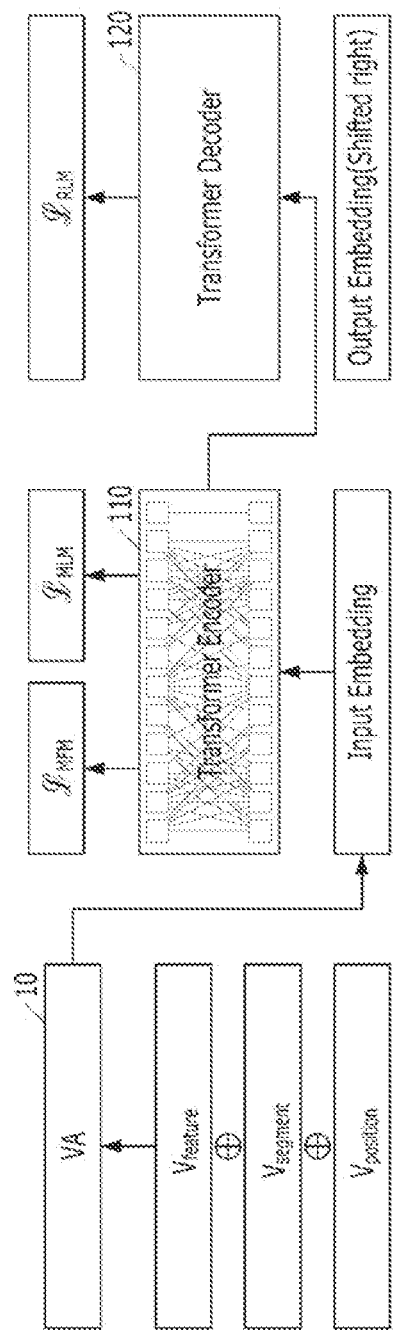
FIG. 1 is a diagram showing the structure of a transformer model for answering questions about a video story according to an embodiment.

Various embodiments will be described in detail below with reference to the accompanying drawings. The following embodiments may be modified to various different forms and then practiced. In order to more clearly illustrate features of the embodiments, detailed descriptions of items that are well known to those having ordinary skill in the art to which the following embodiments pertain will be omitted. Furthermore, in the drawings, portions unrelated to descriptions of the embodiments will be omitted. Throughout the specification, like reference symbols will be assigned to like portions.

Throughout the specification, when one component is described as being "connected" to another component, this includes not only a case where the one component is "directly connected" to the other component but also a case where the one component is "connected to the other component with a third component disposed therebetween." Furthermore, when one portion is described as "including" one component, this does not mean that the portion does not exclude another component but means that the portion may further include another component, unless explicitly described to the contrary.

The embodiments described herein are directed to the construction of a multimodal transformer model for answering questions about a video story.

Hereinafter, the configuration of a computing apparatus for constructing a transformer model will be briefly described first. Next, a method by which the computing apparatus generates an input embedding for a transformer model and trains the transformer model using the input embedding will be described in detail.

In the embodiments described herein, when an input embedding is generated by performing embedding on modalities such as vision and text, the behavior and emotion of each character appearing in a video and information related to the character, such as information an utterer included in a subtitle, are used. For reference, it is also possible to analyze a video story in a variety of ways by making an extension to modality embedding using additional information such as an object, a place, and a relation in a similar manner. In other words, although embedding is performed using information related to a character in order to analyze a video story based on the character in the embodiments described herein, the type of information used during embedding may be added or changed in order to vary the point of analysis.

In addition, in the embodiments described herein, in order to solve the problem of sequential alignment between images and subtitles, the position embedding of video frames corresponding to the start and end sections of subtitle information is used as the position embedding of subtitles. Conventionally, there has been a limitation to the learning of the alignment between images and subtitles due to the learning of expressions that is performed on a per-video frame basis or a per-subtitle basis. In the embodiments described herein, the above problem may be overcome via position embedding.

The embodiments will be described in detail with reference to the accompanying drawings below.

FIG. 1 is a diagram showing the structure of a transformer model for answering questions about a video story according to an embodiment. The transformer model shown in FIG. 1 includes a transformer encoder 110 and a transformer decoder 120, and VA 10 is applied to the transformer encoder 110 as an input embedding, and thus the training of the transformer model is performed.

The transformer model shown in FIG. 1 is implemented by a computing apparatus to be described later, and a method of generating an input embedding will be described in detail below. The embodiments described herein have the feature of performing modeling based on a character by using a feature vector related to a character appearing in a video story when generating an input embedding.

Figure 2:
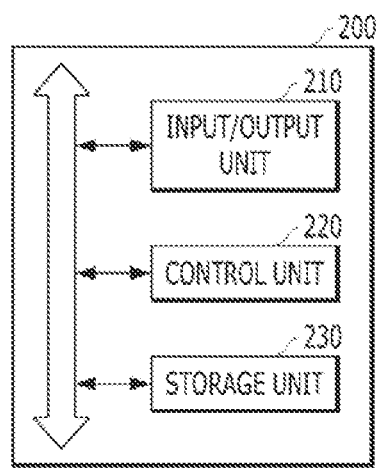
FIG. 2 is a diagram showing the configuration of a computing apparatus for constructing a transformer for answering questions about a video story according to an embodiment.

FIG. 2 is a diagram showing the configuration of a computing apparatus for constructing a transformer for answering questions about a video story according to an embodiment. Referring to FIG. 2, the computing apparatus 200 according to the present embodiment may include an input/output unit 210, a control unit 220, and a storage unit 230.

The computing apparatus 200 may be implemented as a computer, a mobile terminal, a wearable device, or the like that may include an interface capable of interacting with a user. In this case, the computer includes, e.g., a notebook, a desktop, a laptop, and the like each equipped with a web browser. The mobile terminal is, e.g., a wireless communication device capable of guaranteeing portability and mobility, and may include all types of handheld wireless communication devices, such as a Personal Communication System (PCS) terminal, a Personal Digital Cellular (PDC) terminal, a Personal Handyphone System (PHS) terminal, a Personal Digital Assistant (PDA), a Global System for Mobile communications (GSM) terminal, an International Mobile Telecommunication (IMT)-2000 terminal, a Code Division Multiple Access (CDMA)-2000 terminal, a W-Code Division Multiple Access (W-CDMA) terminal, a Wireless Broadband (Wibro) Internet terminal, a smartphone, a Mobile Worldwide Interoperability for Microwave Access (mobile WiMAX) terminal, and the like. Furthermore, the wearable device is an information processing device of a type that can be directly worn on a human body, such as a watch, glasses, an accessory, clothing, shoes, or the like, and can access a remote server or be connected to another terminal directly or via another information processing device over a network.

The input/output unit 210 is a component configured to receive video data and question data and to output video story question answering results. The input/output unit 210 may include various types of input devices (e.g., a keyboard, a touch screen, etc.) for receiving input from a user, and may also include a connection port or communication module for transmitting and receiving data required for answering questions about a video story.

The control unit 220 is a component including at least one processor such as a central processing unit (CPU), and constructs a transformer model for answering questions about a video story and also answers questions about a video story according to a process to be presented below by executing a program stored in the storage unit 230. In other words, the transformer model shown in FIG. 1 may be implemented in such a manner that the control unit 220 executes a program stored in the storage unit 230, and the control unit 220 may generate an input embedding from video data and question data, train the transformer model using the generated input embedding, and then answer questions about a video story. A method by which the control unit 220 generates an input embedding and trains a transformer model using it will be described in detail below.

The storage unit 230 is a component configured such that files and programs can be stored therein, and may be implemented via various types of memory. In particular, the storage unit 230 may store data and a program that enable the control unit 220 to construct a transformer model for answering questions about a video story according to a process to be presented below.

A process in which the control unit 220 generates an input embedding from video data and question data and also trains the transformer model using the generated input embedding by executing the program stored in the storage 230 will be described in detail below. The processes to be described below are performed in such a manner that the control unit 220 executes the program stored in the storage unit 230 unless otherwise specified.

The generation of the input embedding will be described in 1. Preprocessing Step and 2. Generation of Input Embedding, the structure of the transformer model used in the embodiments will be described in 3. Model Structure, and the training of the transformer model will be described in 4. Model Training.

Before describing detailed processes, an overall flow will be briefly described as follows. The computing apparatus 200 receives video data and question data. The video data includes vision data and subtitle data. The question data is configured to include at least one question about a video story and a plurality of options for the question.

The control unit 220 classifies received data according to modality, and divides the received data into vision data and text data. The text data includes subtitle data included in video data, and question data. Next, the control unit 220 classifies individual modalities into a plurality of categories, and extracts feature vectors for the individual resulting categories. In this case, the plurality of categories is characterized by including categories related to the features of the character (see 1. Preprocessing Step).

The control unit 220 generates an input embedding using the feature vectors extracted for the plurality of respective categories. The input embedding is the sum of a feature embedding, a segment embedding, and a modality-wise position embedding. The control unit 220 may generate the feature embedding by concatenating all feature vectors extracted for the plurality of respective categories, may generate the segment embedding by performing embedding lookups using a learnable embedding matrix for the plurality of respective categories, and may generate the modality-wise position embedding by generating vectors including position information related to the feature vectors extracted for the plurality of respective categories (see 2. Generation of Input Embedding).

The control unit 220 may answer questions about a video story by training the transformer model using the input embedding generated as described above (see 3. Model Structure and 4. Model Training).

1. Preprocessing Step

The process of preprocessing video data and subtitle data to generate the input of a transformer model will be described. It is assumed that video data, which is the input of the transformer model, is expressed by Equation 1 below:

$$V=(\{v_1, \ldots, v_n\}, \{s_1, \ldots, s_m\}) \qquad (1)$$

where $v_n$ denotes an n-th frame in an overall video V, and $s_m$ denotes an m-th subtitle in the overall video V.

According to an embodiment, information about each frame may be denoted by $v_{v_n}$ by extracting a feature vector using a pre-trained Inflated 3D ConvNet (I3D) model. Each $v_n$ includes information about characters in the form of $$\{c_{v_n}^1, \ldots, c_{v_n}^{I_{v_n}}\},$$

and information about each character may be represented by Equation 2 below:

$$c_{v_n}^i = (f_{v_n}^i, b_{v_n}^i, e_{v_n}^i) \qquad (2)$$

where $f_{v_n}^i$ is a vector obtained by expressing an image of a bounding box, including the character, as a feature vector using a pre-trained ResNet152 model, $b_{v_n}^i$ is a vector obtained by expressing the behavior of the character as a feature vector using a pre-trained GloVe model, and $e_{v_n}^i$ is a vector obtained by expressing the emotion of the character as a feature vector using the pre-trained GloVe model.

Each $s_M$ includes information $p_{s_m}$ about an utterer and information $$\{w_{s_m}^1, \ldots, w_{s_m}^{J_{s_m}}\}$$

about a sentence composed of words $w_{s_m}^j$ in the form of $$\left(p_{s_m}, \{w_{s_m}^1, \ldots, w_{s_m}^{J_{s_m}}\}\right).$$

Both the utterer and the word are expressed as high-dimensional feature vectors through word embedding, and each sentence included in the subtitle is divided into a plurality of words through tokenization (e.g., tokenization using a word tokenizer).

The question data input together with the video data is represented by Equation 3 below, and each question is also divided into a plurality of words through tokenization.

$$Q=(qw_1, \ldots, qw_l) \qquad (3)$$

2. Generation of Input Embedding

According to an embodiment, the control unit 220 generates an input embedding according to the input format of a pre-trained GPT-2 model using the preprocessed data described above. The generated input embedding is represented by Equation 4 below, and a method of obtaining each term will be described in detail below.

$$VA = V_{feature} + V_{segment} + V_{position} \qquad (4)$$

(1) Feature Embedding $V_{feature}$

The control unit 220 generates a feature embedding $V_{feature}$ by concatenating all $$\left(v_{v_n}, \{c_{v_n}^1, \ldots, c_{v_n}^{I_{v_n}}\}\right)$$

in the form of a two-dimensional sequence according to the passage of time, continuously concatenating all $$\left(p_{s_m}, \{w_{s_m}^1, \ldots, w_{s_m}^{J_{s_m}}\}\right)$$

in the form of a two-dimensional sequence according to the passage of time in the same manner, and finally concatenating $\{qw_1, \ldots, qw_L\}$. The feature embedding generated as described above is expressed by Equation 5 below, and the length of the sequence becomes $N + \Sigma_{v_n=1}^N I_{v_n} + M + \Sigma_{s_m=1}^M J_{s_m} + L$.

$$V_{feature} = \left[\left\{\left(v_{v_n}, \{c_{v_n}^1, \ldots, c_{v_n}^{I_{v_n}}\}\right)\right\}, \right. \qquad (5)$$
$$\left. \left\{\left(p_{s_m}, \{w_{s_m}^1, \ldots, w_{s_m}^{J_{s_m}}\}\right)\right\}, \{qw_1, \ldots, qw_L\}\right]$$

If features are extracted using I3D or ResNet, the dimensions of the extracted features are different from the features extracted using the GloVe model, so that it is necessary to match the dimensions to each other through a single learnable linear layer.

(2) Segment Embedding $V_{segment}$

The control unit 220 generates a segment embedding for each category by classifying the video data and the question data into the following seven categories and then performing embedding lookups in a learnable embedding matrix $E^{pos}$.

1) a feature vector $v_{v_n}$ for each frame (according to an embodiment, extracted using the I3D model)
2) a feature vector $f_{v_n}^i$ for the bounding box of each character (according to one embodiment, extracted using the ResNet model)
3) a feature vector $b_{v_n}^i$ for the behavior of each character (according to an embodiment, extracted using the GloVe model)
4) a feature vector $e_{v_n}^i$ for the emotion of each character (according to an embodiment, extracted using the GloVe model)
5) a feature vector $p_{s_m}$ for the utterer of each subtitle
6) a feature vector $w_{s_m}^j$ for a word included in each subtitle
7) a feature vector $qw_l$ for a word included in each question (3) Modality-wise Position Embedding $V_{position}$ The control unit 220 generates a modality-wise position embedding to represent the positional relationship between the video data and the subtitle data.

The modality-wise position embedding of $\{u_{v_n}, c_{v_n}^i\}$, i.e., a position embedding for an image, may be represented by Equations 6 and 7 below:

$$MPE(u_{v_n}) = e^\tau(v_n) + e^{RC}(v_n) + e^{RS}(v_n) \qquad (6)$$

$$MPE(c_{v_n}^i) = e^\tau(v_n) + e^{RC}(c_{v_n}^i) + e^{RS}(c_{v_n}^i) \qquad (7)$$

In this case, $e^\tau(v_n)$, $e^{RC}(c_{v_n}^i)$, and $e^{RS}(c_{v_n}^i)$ may be obtained as a result of performing embedding lookups on the temporal position of $v_n$, the position of the center of the bounding box of $c_{v_n}^i$, and the size of the bounding box of $c_{v_n}^i$, in learnable embedding matrices $E^\tau$, $E^{RC}$, and $E^{RS}$, respectively.

Furthermore, $e^{RC}(v_n)$, and $e^{RS}(v_n)$ may be obtained as a result of performing embedding lookups on the position of the center of the frame, and the size of the frame in learnable embedding matrices $E^{RC}$, and $E^{RS}$, respectively.

A method of representing each component by an index will now be described. According to one embodiment, the temporal position may be represented by one index corresponding to each frame, the position of the center of the bounding box or the position of the center of the frame may be represented by one index (e.g., from 0 to 23) corresponding to each cell when the frame of the video is divided into a grid form (e.g., 4×6), and the size of the bounding box or the size of the frame may be represented by an index indicating that the size corresponds to one of predefined size intervals.

The modality-wise position embeddings of $$\left(p_{s_m}, \{w_{s_m}^1, \ldots, w_{s_m}^{J_{s_m}}\}\right)$$

and $\{qw_1, \ldots, qw_i\}$, i.e., position embeddings for text, may be represented by Equations 8 to 10 below:

$$MPE(p_{s_m}) = e^{\tau_v}(s_m) \tag{8}$$

$$MPE(w_{s_m}) = e^{\tau_v}(s_m) + e^{\tau_s}(w_{s_m}) \tag{9}$$

In this case, $e^{\tau_v}(s_m)$ is represented as the average of $e^{\tau_v}(v_{n \in s_m})$ corresponding to the subtitle. $e^{\tau_s}(w_{s_m})$ may be obtained by performing an embedding lookup using the position of a word in a sentence included in the subtitle in a learnable embedding matrix $E^{\tau_s}$.

$$MPE(qw_t) = e^{\tau_s}(qw_t) \tag{10}$$

In this case, $e^{\tau_s}(qw_t)$ may be obtained by performing an embedding lookup using the position of a word in the question in a learnable embedding matrix $E^{\tau_s}$.

As shown in Equation 4, the control unit 220 may generate the input embedding by adding the segment embedding corresponding to the category including each feature and the modality-wise position embedding according to the position of each feature to the feature embedding.

3. Model Structure

The structure of the multimodal transformer model according to the embodiment is shown in FIG. 1 described above. The control unit 220 implements the transformer model shown in FIG. 1 by executing the program stored in the storage unit 230.

Referring to FIG. 1, the control unit 220 may apply VA 10 as an input embedding to the encoder 110 of the transformer model, and the decoder 120 of the transformer model may output an answer to a given question. A method of training the transformer model shown in FIG. 1 will be described in "4. Model Training" below.

The transformer model according to the embodiment may be implemented using an existing model such as a GPT-2 model, and the process of generating an answer through the transformer model is the same as that using an existing transformer model, so that a detailed description thereof will be omitted.

4. Model Training

Before describing a method of training the transformer model shown in FIG. 1, the overall video data is divided into a text information set W and an image information set V for convenience of description.

The training of the transformer model is performed via multi-task learning including Masked Language Modeling (MLM), Masked Frame Modeling (MEM), and Response Language Modeling (RLM).

The respective types of learning may be performed according to Equations 11 to 13 below. Equation 11 is intended to perform learning through masked language modeling, Equation 12 is intended to perform learning through masked frame modeling, and Equation 13 is intended to perform learning through response language modeling.

$$\mathcal{L}_{MLM}(\theta) = -\mathbb{E}_D \log P_\theta(w^m | w^{\setminus m}, v) \tag{11}$$

$$\mathcal{L}_{MFM}(\theta) = \mathbb{E}_D f_\theta(v_m | v_{\setminus m}, s)$$

Regression $f_\theta(v_m | v_{\setminus m}, s) = \sum_{i=1}^M \|h_\theta(v_m^{(i)}) - r(v_m^{(i)})\|_2^2$ Noise Contrastive Estimation $f_\theta(v_m | v_{\setminus m}, s) = \sum_{i=1}^M \log NCE(g_\theta(v_m^{(i)}) | g_\theta(v_{neg}))$ \hfill (12)

$$\mathcal{L}_{RLM}(\theta) = -E_{(VA,Q,R) \sim D} = \log \prod_{j=0}^m P(r_{nj} | VA, Q, r_{n,<j}) \tag{13}$$

The control unit 220 may answer questions about a video story using the transformer model trained through the process described above.

Figure 3:
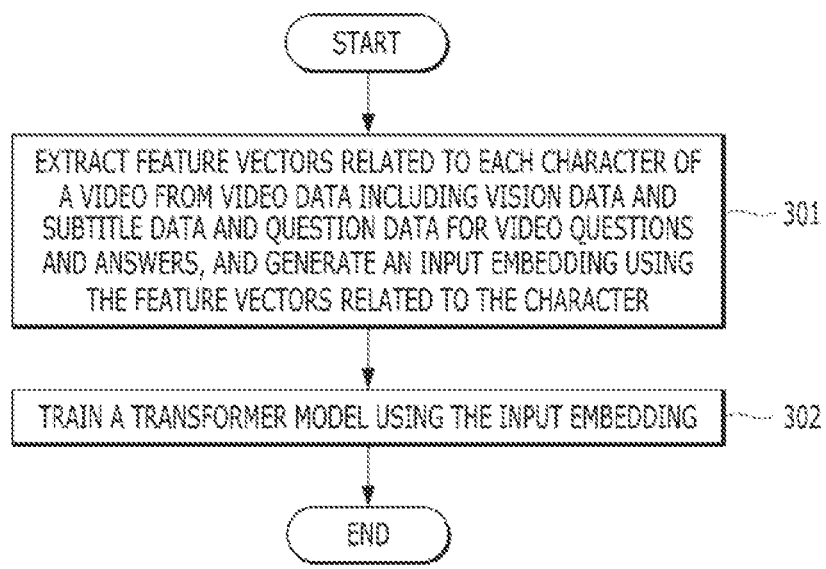
FIGS. 3 to 5 are flowcharts illustrating a method of constructing a transformer model for answering questions about a video story according to embodiments.
Figure 4:
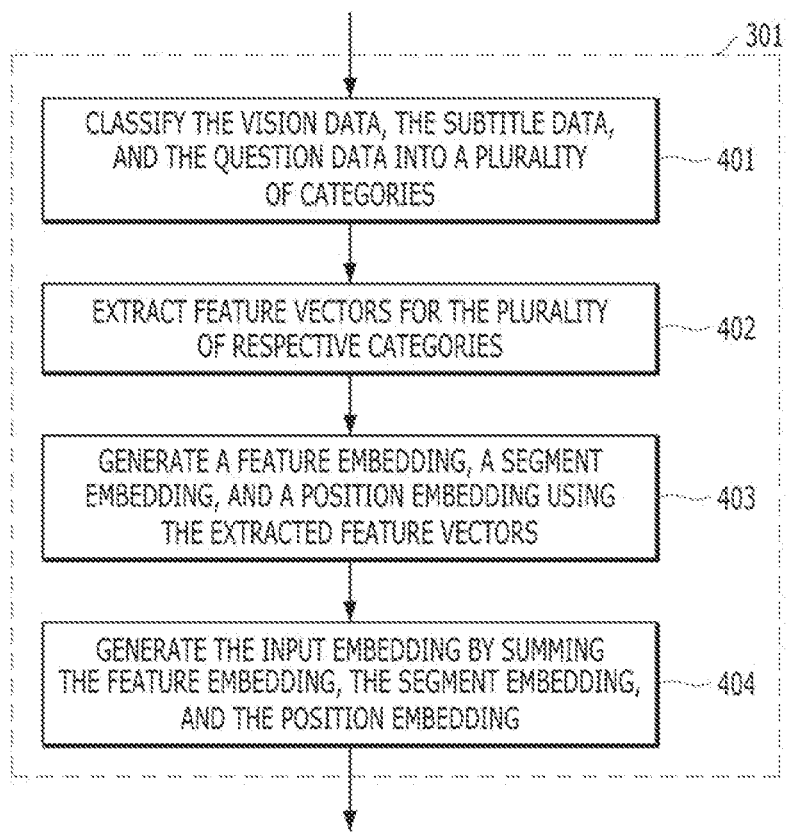
Figure 5:
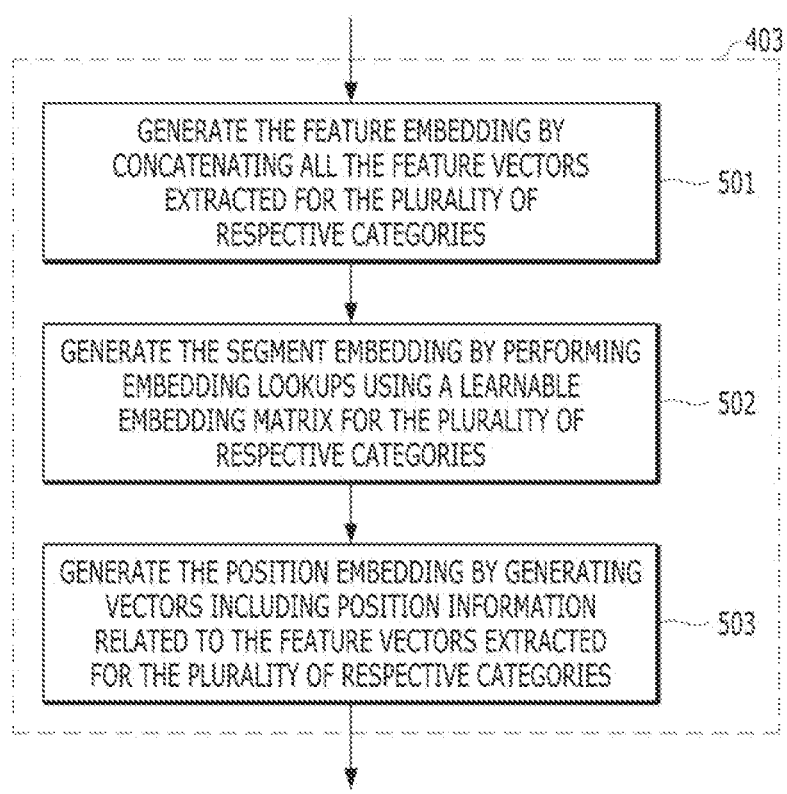

A method of constructing a transformer model for answering questions about a video story using the above-described computing apparatus 200 will be described below. FIGS. 3 to 5 are flowcharts illustrating a method of constructing a transformer model for answering questions about a video story according to embodiments.

The method of constructing a transformer model for answering questions about a video story model according to the embodiments shown in FIGS. 3 to 5 includes steps that are processed in a time-series manner by the computing apparatus 200 shown in FIG. 2. Accordingly, the descriptions that are omitted below but have been given above in conjunction with the computing apparatus 200 of FIG. 2 may also be applied to the method of constructing a transformer model for answering questions about a video story model according to the embodiments shown in FIGS. 3 to 5.

Referring to FIG. 3, at step 301, the control unit 220 of the computing apparatus 200 extracts feature vectors related to each character of a video from video data including vision data and subtitle data and question data for answering video questions and answers, and generates an input embedding using the feature vectors related to the character.

The control unit 220 classifies the video data and the question data according to modality, and divides them into vision data and text data. The text data includes subtitle data included in the video data, and the question data. Next, the control unit 220 classifies individual modalities into a plurality of categories, and extracts feature vectors for the respective resulting categories. In this case, the plurality of categories is characterized by including categories related to features of a character.

The control unit 220 generates an input embedding by using the feature vectors extracted for the respective categories. The input embedding is the sum of a feature embedding, a segment embedding, and a modality-wise position embedding.

Detailed steps included in step 301 are shown in FIG. 4.

Referring to FIG. 4, at step 401, the control unit 220 classifies the vision data and the text data (the subtitle data and the question data) into the plurality of categories. In this case, the plurality of categories is characterized by including categories related to features of a character.

At step 402, the control unit 220 extracts feature vectors for the plurality of respective categories.

At step 403, the control unit 220 generates a feature embedding, a segment embedding, and a position embedding using the extracted feature vectors.

Detailed steps included in step 403 are shown in FIG. 5.

Referring to FIG. 5, at step 501, the control unit 220 generates the feature embedding by concatenating all the feature vectors extracted for the plurality of respective categories.

At step 502, the control unit 220 generates the segment embedding by performing embedding lookups using a learnable embedding matrix for the plurality of respective categories.

At step 503, the control unit 220 generates the position embedding by generating vectors including position information related to the feature vectors extracted for the plurality of respective categories.

Returning to FIG. 4, at step 404, the control unit 220 generates an input embedding by combining the feature embedding, the segment embedding, and the position embedding.

Returning to FIG. 3, at step 302, the control unit 220 trains a transformer model using the input embedding.

According to the above-described embodiments, there may be expected the effect of effectively acquiring desired information even when the length of a video story is long by performing modeling based on a character appearing in the video story.

The term 'unit' used in the above-described embodiments means software or a hardware component such as a field-programmable gate array (FPGA) or application-specific integrated circuit (ASIC), and a 'unit' performs a specific role. However, a 'unit' is not limited to software or hardware. A 'unit' may be configured to be present in an addressable storage medium, and also may be configured to run one or more processors. Accordingly, as an example, a 'unit' includes components, such as software components, object-oriented software components, class components and task components, processes, functions, attributes, procedures, subroutines, segments in program code, drivers, firmware, microcode, circuits, data, a database, data structures, tables, arrays, and variables.

Each of the functions provided in components and 'unit (s)' may be coupled to a smaller number of components and 'unit (s)' or divided into a larger number of components and 'unit (s).'

In addition, components and 'unit(s)' may be implemented to run one or more CPUs in a device or secure multimedia card.

The method of constructing a transformer model for answering questions about a video story according to the embodiments described through FIGS. 3 to 5 may be implemented in the form of a computer-readable medium that stores instructions and data that can be executed by a computer. In this case, the instructions and the data may be stored in the form of program code, and may generate a predetermined program module and perform a predetermined operation when executed by a processor. Furthermore, the computer-readable medium may be any type of available medium that can be accessed by a computer, and may include volatile, non-volatile, separable and non-separable media. Furthermore, the computer-readable medium may be a computer storage medium. The computer storage medium may include all volatile, non-volatile, separable and non-separable media that store information, such as computer-readable instructions, a data structure, a program module, or other data, and that are implemented using any method or technology. For example, the computer storage medium may be a magnetic storage medium such as an HDD, an SSD, or the like, an optical storage medium such as a CD, a DVD, a Blu-ray disk or the like, or memory included in a server that can be accessed over a network.

Furthermore, the method of constructing a transformer model for answering questions about a video story according to the embodiments described through FIGS. 3 to 5 may be implemented as a computer program (or a computer program product) including computer-executable instructions. The computer program includes programmable machine instructions that are processed by a processor, and may be implemented as a high-level programming language, an object-oriented programming language, an assembly language, a machine language, or the like. Furthermore, the computer program may be stored in a tangible computer-readable storage medium (for example, memory, a hard disk, a magnetic/optical medium, a solid-state drive (SSD), or the like).

Accordingly, the method of constructing a transformer model for answering questions about a video story according to the embodiments described through FIGS. 3 to 5 may be implemented in such a manner that the above-described computer program is executed by a computing apparatus. The computing apparatus may include at least some of a processor, memory, a storage device, a high-speed interface connected to memory and a high-speed expansion port, and a low-speed interface connected to a low-speed bus and a storage device. These individual components are connected using various buses, and may be mounted on a common motherboard or using another appropriate method.

In this case, the processor may process instructions within a computing apparatus. An example of the instructions is instructions which are stored in memory or a storage device in order to display graphic information for providing a Graphic User Interface (GUI) onto an external input/output device, such as a display connected to a high-speed interface. As another embodiment, a plurality of processors and/or a plurality of buses may be appropriately used along with a plurality of pieces of memory. Furthermore, the processor may be implemented as a chipset composed of chips including a plurality of independent analog and/or digital processors.

Furthermore, the memory stores information within the computing apparatus. As an example, the memory may include a volatile memory unit or a set of the volatile memory units. As another example, the memory may include a non-volatile memory unit or a set of the non-volatile memory units. Furthermore, the memory may be another type of computer-readable medium, such as a magnetic or optical disk.

In addition, the storage device may provide a large storage space to the computing apparatus. The storage device may be a computer-readable medium, or may be a configuration including such a computer-readable medium. For example, the storage device may also include devices within a storage area network (SAN) or other elements, and may be a floppy disk device, a hard disk device, an optical disk device, a tape device, flash memory, or a similar semiconductor memory device or array.

The above-described embodiments are intended for illustrative purposes. It will be understood that those having ordinary knowledge in the art to which the present invention pertains can easily make modifications and variations without changing the technical spirit and essential features of the present invention. Therefore, the above-described embodiments are illustrative and are not limitative in all aspects. For example, each component described as being in a single form may be practiced in a distributed form. In the same manner, components described as being in a distributed form may be practiced in an integrated form.

The scope of protection pursued via the present specification should be defined by the attached claims, rather than the detailed description. All modifications and variations which can be derived from the meanings, scopes and equivalents of the claims should be construed as falling within the scope of the present invention.

The invention claimed is:

1. A method of constructing a transformer model for answering questions about a video story, the method comprising:
   extracting feature vectors related to each character of a video from video data including vision data and subtitle data and question data for video questions and answers, and generating an input embedding using the feature vectors related to the character; and
   training a transformer model using the input embedding,
   wherein generating the input embedding comprises:
      classifying the vision data, the subtitle data, and the question data into a plurality of categories;
      extracting feature vectors for the plurality of respective categories;
      generating a feature embedding, a segment embedding, and a position embedding using the extracted feature vectors; and
      generating the input embedding by summing the feature embedding, the segment embedding, and the position embedding, and
   wherein the plurality of categories includes one or more categories related to features of the character.

2. The method of claim 1, wherein the categories related to the features of the character comprise a bounding box including the character in an image frame included in the video, behavior of the character, and emotion of the character.

3. The method of claim 1, wherein generating the feature embedding, the segment embedding, and the position embedding using the extracted feature vectors comprises:
   generating the feature embedding by concatenating all the feature vectors extracted for the plurality of respective categories;
   generating the segment embedding by performing embedding lookups using a learnable embedding matrix for the plurality of respective categories; and
   generating the position embedding by generating vectors including position information related to the feature vectors extracted for the plurality of respective categories.

4. The method of claim 1, wherein training the transformer model is performed via multi-task learning including masked language modeling, masked frame modeling, and response language modeling.

5. A non-transitory computer-readable storage medium having stored therein a program for performing the method set forth in claim 1.

6. A computer program that is executed by a computing apparatus and stored in a non-transitory storage medium to perform the method set forth in claim 1.

7. A computing apparatus for constructing a transformer model for answering questions about a video story, the computing apparatus comprising:
   an input/output unit configured to receive video data including vision data and subtitle data and question data for video questions and answers, and to output video story question and answer results;
   a storage unit configured to store a program and data for answering questions about a video story; and
   a control unit comprising at least one processor, and configured to construct a transformer model for answering the questions about the video story by executing the stored program;
   wherein the control unit extracts feature vectors related to each character of a video from the video data and the question data, generates an input embedding using the feature vectors related to the character, and trains the transformer model using the input embedding,
   wherein when generating the input embedding, the control unit generates the input embedding by classifying the vision data, the subtitle data, and the question data into a plurality of categories, extracting feature vectors for the plurality of respective categories, generating a feature embedding, a segment embedding, and a position embedding using the extracted feature vectors, and summing the feature embedding, the segment embedding, and the position embedding;
   wherein the plurality of categories comprises one or more categories related to features of the character.

8. The method of claim 1,
   wherein the feature embedding, the segment embedding, and the position embedding include position information of the character in an image frame included in the video.

9. The computing apparatus of claim 7, wherein the categories related to the features of the character comprise a bounding box including the character in an image frame included in the video, behavior of the character, and emotion of the character.

10. The computing apparatus of claim 7, wherein when generating the feature embedding, the segment embedding, and the position embedding using the extracted feature vectors, the control unit generates the feature embedding by concatenating all the feature vectors extracted for the plurality of respective categories, generates the segment embedding by performing embedding lookups using a learnable embedding matrix for the plurality of respective categories, and generates the position embedding by generating vectors including position information related to the feature vectors extracted for the plurality of respective categories.

11. The computing apparatus of claim 7, wherein when training the transformer model, the control unit performs multi-task learning including masked language modeling, masked frame modeling, and response language modeling.

* * * * *